United States Patent [19]
Hennessey

[11] Patent Number: 5,367,957
[45] Date of Patent: Nov. 29, 1994

[54] TUNABLE TIMING CIRCUIT AND METHOD FOR OPERATING SAME AND BLASTING DETONATOR USING SAME

[75] Inventor: Clarence E. Hennessey, Dallas, Tex.

[73] Assignee: Texas Instruments Incorporated, Dallas, Tex.

[21] Appl. No.: 40,787

[22] Filed: Mar. 31, 1993

[51] Int. Cl.[5] .............................................. F23Q 7/02
[52] U.S. Cl. ..................................... 102/217; 361/249
[58] Field of Search ............... 102/200, 217, 218, 276, 102/202.5, 206; 361/248, 249, 252; 318/618

[56] References Cited

U.S. PATENT DOCUMENTS

| | | | |
|---|---|---|---|
| 4,419,933 | 12/1983 | Kirby et al. | 102/206 |
| 5,229,700 | 7/1993 | Stitt et al. | 318/618 |

*Primary Examiner*—Daniel T. Pihulic
*Attorney, Agent, or Firm*—Robby T. Holland; Wade James Brady, II; Richard L. Donaldson

[57] ABSTRACT

An externally tunable clock circuit (10) and a method for adjusting the calibration of a clock circuit with an externally defined time period. A voltage controlled oscillator (VCO) (40) provides clock signals of variable frequency, and a counter (42) receives timing and control signals to provide a digital count indicative of clock signals during a predetermined period. The input voltage to the VCO (40) is adjusted based on differences between the oscillator clock count and a predetermined value. Calibration of the clock circuit (10) is done by counting clock signals from the VCO (40) during an externally defined time period, then comparing the clock signal count with a predetermined value that represents a desired frequency. The VCO frequency is then adjusted according to the difference between the clock signal count and the predetermined value. A system (20) can embody a number of such tunable clock circuits (10) and may include a controller (30) connected to provide timing and control signals to define a predetermined time period for performing oscillator adjustments. The system enables accurate timing and individual control of sequential operations. This is particularly advantageous for operations at different locations, for example, to provide a plurality of detonators in blasting or explosive detonation operations.

9 Claims, 3 Drawing Sheets

TUNABLE TIMING CIRCUIT AND METHOD FOR OPERATING SAME AND BLASTING DETONATOR USING SAME

BACKGROUND OF THE INVENTION

1. Field of the Invention

This invention pertains to improvements in timing and control circuits, and, more particularly, to externally tunable timing circuits, and methods for operating such circuits. The invention also pertains to improvements in circuits and methods for synchronizing a plurality of timers, and to improvements in detonators for explosives, or the like.

2. Technical Background

A variety of applications exists for timing control systems. This is especially true in those instances in which a control unit starts one or more timing circuits that generate a signal after a predefined delay period. The delay period may be individually programmed into each circuit through the control unit. The timing circuits are often located at an operation site selected to reduce reliability problems that can result from interference or physical stress. Systems are often formed with multiple timing circuits, and are useful to control time sequenced operations, particularly in performing the individual operations at different locations.

In many systems applications, such as those involving generating acoustic or vibration waveforms, control of the sequence of operations to accuracies ranging between milliseconds and microseconds often may be necessary. The stability of the oscillator upon which clock signals are based in each timing circuit is important to the accuracy of the event timing. To achieve this reliability, crystal oscillators can be used in many applications. While crystal oscillators are normally accurate, they are generally unsatisfactory for operation in harsh vibration environments, such as those experienced, for instance, in the blasting industry. On the other hand, the performance of a voltage controlled oscillator (VCO) is normally stable by high impact shock waves of the type generated by explosive charges. Nevertheless, circuits that incorporate VCOs are known to experience rapid frequency drifts.

In theory, a solution to the problem of frequency drift in a time delay system formed with VCOs should entail calibration of either the clock signal or the delay time before the control unit activates the timing circuit. Efforts to carry out this approach have had limited success. In systems that include a large number, for example, 100, timing circuits, the time required to input delay information under calibrated conditions can be long enough to allow some of the VCOs to drift.

Improved time accuracies are being sought to provide greater control over blasting operations, and to improve the quality of data gained, for example, for seismic or similar analyses by the detonation of explosive charges in predetermined time sequences. Also, in blasting operations, an improved accuracy in timing successive explosions can lead to greater control over ground vibration and the fracture of rock formations. For example, in some instances it is desirable to control blasting detonations to provide reinforcing shock waves, improving blasting efficiency. In other instances, it may also be desirable to generate secondary accurate shock waves to create a canceling effect on the propagation of other explosive blasts. This nulling can be applied, for example, to limit damage due to ground vibrations propagating from the locus of blasting into remote, but sensitive, regions.

For example, U.S. Pat. No. 4,419,933 shows a system arrangement in which a central unit sequentially provides reference timing signals to some timing and load starting devices. The timing signals provided to each device define a delay that is to precede starting a device. Each delay defined by the timing signals is counted with a VCO clock signal generated on the corresponding device.

Thus, programming of the delay time can be done by counting oscillator clock pulses during a timed period corresponding to the desired delay. After receiving a fire command from the control unit, each device generates the predefined delay period by counting out the same number of pulses. Accuracy of this technique for implementing a programmable delay is, of course, dependent upon the stability of the clock frequency between the times at which programming begins and all operations have been started.

When many devices are serially programmed for delay periods ranging up to several seconds, the programming process can be lengthy. For example, when a thousand devices are programmed with varying delay periods, assuming the delay periods range from zero to 3 seconds with an average delay of 1.5 seconds, the time required for programming can be as high as 25 minutes. The cumulative drift among the VCO clocks during a 25 minute period would make it difficult to maintain millisecond accuracy in the delay sequence, and would make microsecond accuracy unattainable.

In many applications, such as those involving detonation of explosive charges in which a number of timer circuits are employed, and in which critical timing relationships among the timers is desired to be maintained, often the destruction of one of the timers causes loss of synchronization or coordination among the remaining timers. This may be especially true in those instances in which subsequent timers base their initial timing on previous timers. Also, in such instances where successive timing is "in series" from one timer to the next, any timing errors in preceding timers results in similar timing errors in successive timers.

SUMMARY OF THE INVENTION

In light of the above, it is, therefore, an object of the invention to provide an improved method for calibrating a voltage controlled oscillator (VCO) clock circuit with an externally defined period.

It is another object of the invention to provide an improved method for adjusting the frequencies of a plurality of voltage controlled oscillators.

It is yet another object of the invention to provide an improved method for initiating a series of timed activities, such as a blasting operation or the like, at each of a plurality of locations.

It is still another object of the invention to provide an improved method for activating a blasting detonator circuit of the type having a voltage controlled oscillator (VCO) to control a time delay before detonation.

It is still yet another object of the invention to provide an improved externally tunable clock circuit, and a system incorporating same that can be used in a blasting detonator circuit, said system providing for individual control of timed detonations at a plurality of locations, activation of each detonation being delayable by a predetermined time periods that may be different.

It is still another object of the invention to provide an improved system for individually controlling various timed operations among a plurality of locations, activation of an operation at each location being delayable by a programmable time.

It is yet another object of the invention to provide an improved clock circuit using a VCO that can be rapidly calibrated.

One advantage of the circuit and method of the invention is that in a number of timing circuits can be rapidly and simultaneously synchronized and calibrated with an external signal to achieve highly accurate timing of plural events.

Another advantage of the method and circuit of the invention is that applications, such as blasting operations or the like, in which the timing of each of a plurality of circuits is important, the destruction of one or more of the different timing circuits does not affect the timing or synchronization of the remaining circuits.

Another advantage of the invention is that the clock circuit can be operated over a wide range of supply voltages, or with a varying supply voltage, while maintaining a constant VCO frequency.

Another advantage provided by the circuit and method of the invention is increased accuracy is enabled in blasting operations, especially those involving successive explosions.

These and other objects, features and advantages of the invention will become apparent to those skilled in the art from the following detailed description of the invention when read in conjunction with the accompanying drawings and appended claims.

According to a broad aspect of the invention, an externally tunable clock circuit and a method for adjusting the calibration of a clock circuit with an externally defined time period are provided. The clock circuit comprises a voltage controlled oscillator (VCO) for providing clock signals of variable frequency based on an input voltage, and counting circuitry coupled to receive timing and control signals. The counting circuitry provides a digital count indicative of clock signals generated by the VCO during a predetermined period. The circuit further includes elements coupled to adjust the VCO input voltage based on differences between the VCO clock count and a predetermined value.

Calibration of the clock circuit is effected by counting clock signals emitted from the VCO for the duration of an externally defined time period and then comparing the clock signal count with a predetermined value. The predetermined value is indicative of a desired frequency. The VCO frequency is adjusted by modifying the VCO control voltage with an adjustment signal. The adjustment signal is based on the difference between the clock signal count and the predetermined value.

In preferred embodiments of the adjustment method, the above-recited sequence of steps may be repeated multiple times in order to converge the VCO frequency to a desired value. Furthermore, both the clock signal count and the predetermined value may be represented digitally, with the method further including the step of providing analog representations of the clock signal count and the predetermined value. In such embodiments the difference between the clock signal count and the predetermined value can be computed with a differential amplifier.

In other broad aspects of the invention, a system of tunable clock circuits including a controller coupled to provide timing and control signals to each circuit in order to define a predetermined time period for performing VCO adjustments are presented. The method described above is applied to the system by counting clock signals emitted from each VCO for the duration of the time period, and comparing each clock signal count with the predetermined value. An adjustment signal is developed for each VCO based on the difference between the corresponding clock signal count and the predetermined value. The frequency of each VCO is adjusted by modifying the VCO control voltage with the associated adjustment signal. The system enables accurate timing and individual control of operations performed in a sequence. This is particularly advantageous when the operations are to be performed at different locations. Activation of each operation may occur after a programmable delay time. In an exemplary embodiment of the system, the clock circuits are formed with additional components to provide a plurality of detonators for blasting operations.

BRIEF DESCRIPTION OF THE DRAWINGS

The invention is illustrated in the accompanying drawings, in which.

In the various figures of the drawing, like reference numerals are used to denote like or similar parts. Although certain embodiments of the invention are disclosed, these are merely exemplary.

DETAILED DESCRIPTION OF THE PREFERRED EMBODIMENTS

Figure 1:
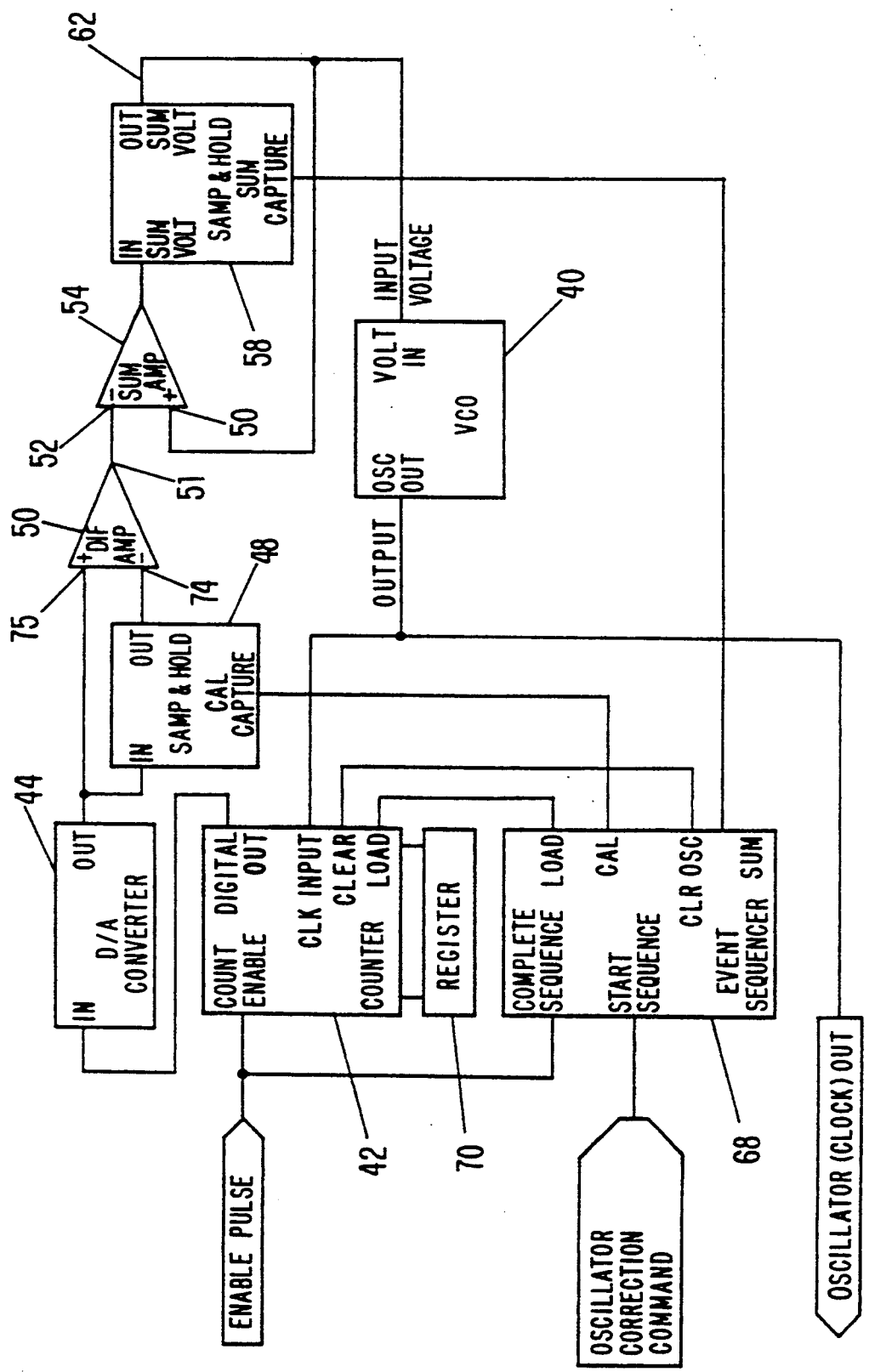
FIG. 1 shows an electrical schematic and circuit block diagram of a clock circuit that is tunable from a location external to the circuit, according to the invention.

A circuit block diagram of a preferred embodiment of the invention is shown in FIG. 1 in which a clock circuit 10 is provided that can be used, for instance, to activate a desired operation after a predetermined delay. The frequency of the clock circuit 10 can be calibrated or tuned from a location that may be external to the circuit, a feature that is of interest, especially in blasting or explosive detonation applications. Although the embodiments of the invention are described in particular relation to blasting or explosive detonation applications, the invention is not intended to be limited to such applications or for uses only in such environments.

Figure 2:
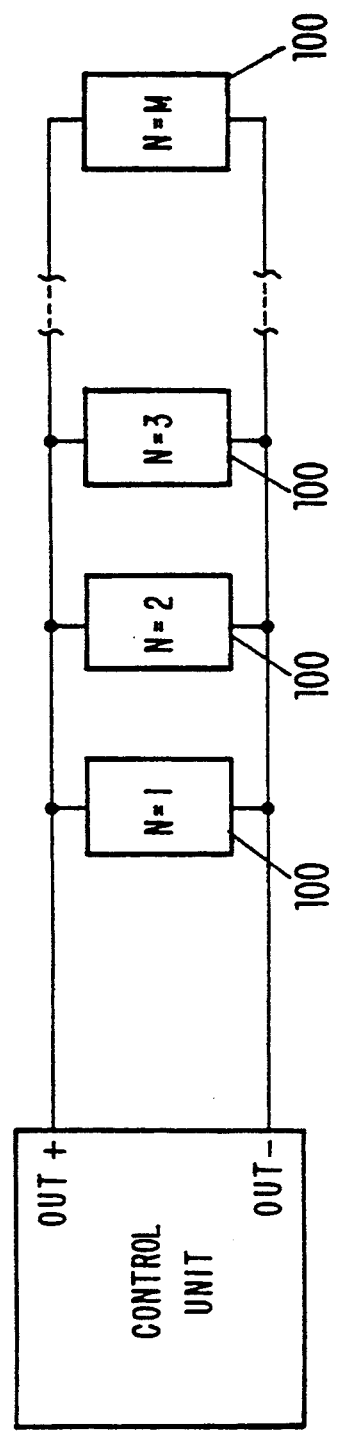
FIG. 2 shows a circuit block diagram illustrating a combination of clock circuits in a system under the command of a control unit.

The clock circuit 10 may be implemented as a part of an integrated circuit to reduce overall size and improve uniformity in device characteristics. With such uniformity, a plurality of individual circuits 10 may be combined to form a system 20 of M circuits 100 under the command of a control unit 30, as illustrated in the simplified circuit block diagram of FIG. 2.

The circuits 100 may be wired in any serial or parallel combination, a feature that is also of particular interest in blasting applications. Although not described in detail, it will be understood that each leg should be balanced to exhibit matching impedance and voltage requirements with respect to the control unit 30. Also, the number of circuits in series should be limited to preserve the operating voltage of the control unit.

The control unit 30 may be coupled, for example by hard wiring, rf transmission circuitry, or the like, to the individual circuits 100 to individually address each circuit and to provide timing and control signals to them. Among other things, the control unit 30 defines a time period for tuning the individual clock circuits 10 within the circuits 100. The control unit 30 may also provide signals for individually programming each circuit 100 with different delays. The control unit 30 also provides a control signal directing each circuit 100 to begin their measurements of the predefined delays.

The circuits 100 each initiate an operation after the lapse of its associated delay. Through incorporation of the clock circuits 10, the system 20 enables a programmable sequence of time delayed operations with high accuracy, for example, with microsecond resolution.

With reference again to FIG. 1, the clock circuit 10 develops and compares analog values representing two counts: a calibration count, and a VCO count that occurs within an externally defined predetermined period. Sequencing control of the counts is maintained by an event sequencer 68.

The calibration count is first developed from a calibration value loaded in a register 70, as the event sequencer 68 causes the calibration value to be moved from the register 70 into the counter 42. The calibration value corresponds to the number of clock pulses that should be generated by the VCO 40 during an known calibration period if the VCO is operating at the desired frequency. The counter 42 then outputs the calibration count to a D/A converter 44. The event sequencer 68 also enables a first sample and hold circuit 48 to capture the analog version of the calibration count, and to maintain that analog value at an inverting input 74 of a differential amplifier 50.

In the embodiment illustrated, the calibration value is represented digitally, and is temporarily or permanently stored in the register 70 for loading into the counter 42. The calibration value may also be changed, if desired, through external programming (not shown), providing greater flexibility in the operation of the clock circuit 10. Alternately, the digital calibration count could be loaded directly into the D/A converter 44 from an external register (not shown) or from the controller 30.

Next, a VCO count is developed by a voltage controlled oscillator (VCO) 40 that provides a clock signal to the counter 42 when enabled by the event sequencer 68. The VCO pulses are counted by the counter 42, and processed through the D/A converter 44. The analog output from the D/A converter 44 is applied to the noninverting input of the differential amplifier 50 that provides an analog VCO correction signal on line 51 based on the difference between the analog calibration and VCO count signals.

The analog correction signal on the line 51 is used to adjust the input voltage to the VCO 40, based on the difference between the VCO clock count and the calibration count. To achieve the VCO adjustment, the correction signal developed by the differential amplifier 50 is provided to an inverting input 52 of a summing amplifier 54, the output of which is connected to the input to a second sample and hold circuit 58. The noninverting input 60 of the summing amplifier 54 receives the output 62 of the second sample and hold circuit 58. The summed voltage available at the output 62 provides the control voltage input to the VCO 40.

In operation, the event sequencer 68 is started by an external command signal, denoted as "oscillator correction command". The calibration count developed from the value contained in the register 70 is then developed, converted to an analog signal that is stored in the sample and hold circuit 48, and applied to the negative input 74 of the differential amplifier 50.

The counter 42 then is cleared and set to count VCO clock signals during an "enable pulse" that is externally provided to define a predetermined delay. The "enable pulse" is also provided to the event sequencer 68 as a reference for sequencing the remaining events. The VCO clock count is converted by the D/A converter 44 to an analog representation thereof at the noninverting input 78 of the differential amplifier 50.

The differential amplifier 50 generates an analog correction signal to the inverting input 52 of the summing amplifier 54, based on the difference between the VCO clock count and the calibration count. The event sequencer 68 then enables the second sample and hold circuit 58 to capture the summed output of the amplifier 54. The input voltage to the VCO 40 and, therefore the frequency of the VCO 40, is thereby revised or corrected, so that the VCO operates at the frequency necessary to produce the number of pulses specified by the calibration value within the time defined by the externally applied enable pulse. It will therefore be appreciated that the frequency of the VCO can be precisely adjusted by specifying the period of the enable pulse, the VCO frequency being adjusted by operation of the circuit to the frequency required to produce the number of pulses specified by the calibration value in the register 70 within the specified period. As mentioned above, the calibration value also may be selectively changed, giving additional control to the adjustment and control over the frequency of the VCO 40. The clock circuit 10 is therefore not only precisely externally adjustable, but can accommodate a wide range of operations for manifold applications.

Figure 3:
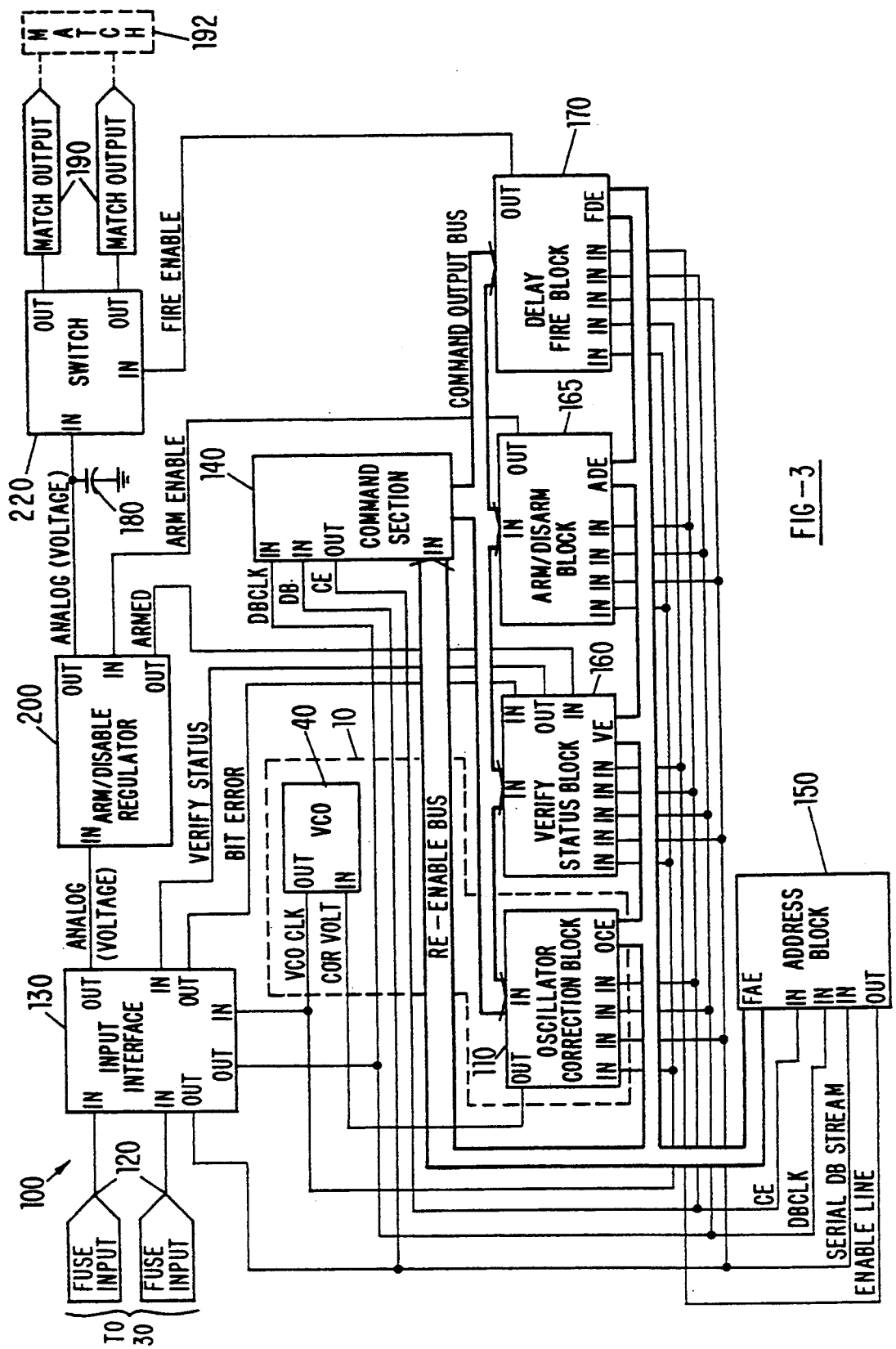
FIG. 3 shows an electrical schematic and circuit block diagram of a blasting detonator comprising the clock circuit, according to the invention.

As an example, the circuit block diagram of FIG. 3 shows a clock circuit 10 in combination with other circuitry to form an addressable blasting detonator circuit 100. In this embodiment, the VCO 40 and the VCO correction section 110 form the circuit 10 described above with reference to FIG. 1.

The detonator circuit 100 has an input interface circuit 130 that receives a "fuse input" signal from the control unit 30, via a pair of input terminals 120. The fuse input signal includes a driving voltage from the control unit 30 on which a serial bit stream of timing and control signals is impressed. The timing and control signals provide, among other things, signals corresponding to the enable pulse and oscillator correction command, described above with reference to FIG. 1. The interface circuit 130 conditions the timing and control signals for use in the detonator circuit 100, separate from the driving voltage. Signal conditioning includes removing noise and synchronizing the data bit flow to a data bit clock derived from the VCO 40 to enable clocked movement of the data through the detonator circuit 100.

The conditioned timing and control signals are provided to a command section 140 and to other subcircuits, including a VCO correction circuit block 110, an address circuit block 150, a verify status circuit block 160, an arm/disarm circuit block 165, and a delay fire circuit block 170. The delay fire circuit block 170 includes circuitry for receiving an externally programmed delay time, and circuitry for generating a fire signal at the end of the delay. A data clock signal is provided to all of these subcircuits on the DBCLK line from the control circuit 30 via the input interface 130.

After data and control signals sent from the control unit 30 are conditioned through the input interface 130, they are initially accepted by the command section 140. The command section 140 converts an initial serial bit stream of command information into an N bit parallel word, decodes the word into a command, and selectively enables an appropriate one of circuit block 110, 150, 160, 165 or 170, to accept the command and a subsequent bit stream of data. After the command section has decoded the command word and enabled one of the circuit blocks, the command section disables itself so that only the enabled circuit block is able to accept any subsequent data. After the enabled circuit block accepts the data, it sends a re-enable signal on a re-enable bus, that includes lines OCE (oscillator correction enable), VE (verify status enable), ADE (arm/disarm enable), FDE (fire delay enable), and FAE (fire address enable) to re-enable the command section 140.

To produce an output "detonate" signal, the detonator circuit 100 includes a storage capacitor 180 that can be charged with either of two voltage levels, for example, 10 volts or 20 volts. An arm/disarm regulator 200, under the control of the arm/disarm circuit block 165, regulates the charge on the storage capacitor 180 to one of the two voltage levels. The higher voltage level is suitable for providing a detonation current to a pair of "match output" terminals 190. As indicated by dashed lines, the terminals 190 may be connected to a match 192 or other combustible element to effect ignition or detonation. Generally the combustible element will be a discrete element that is selectively coupled to the detonator circuit 100. A fire control switch 220, operated by the delay fire circuit block 170, controls the discharge of the capacitor 180 through the match output terminals 190 for ignition of a match 192.

As mentioned above, the signal that is applied to the fuse input 120 from the control unit 30 includes a voltage level on which the control signals are impressed. The voltage portion of the signal is rectified and used to charge the capacitor 180. The capacitor 180 can then be used, in addition to providing the detonation current to the match 192, to supply power for the operation of the detonator circuit 100. This is of particular advantage in blasting operations, since a voltage source need not be supplied to power the various detonator circuits at diverse remote locations. However, since power derived from a discharging capacitor source changes as the capacitor charge dissipates, it will be appreciated that normally the frequency of the VCO also would be drastically changed. The clock circuit 10, however, can be operated such that the event sequencer 68 (see FIG. 1) continually causes the comparison of the VCO clock pulses with the comparison value, thereby maintaining the VCO frequency at the calibrated value, at least until the capacitor voltage drops below the level required to sustain circuit operation.

The detonator circuit 100 has a permanent address for selective response to specific commands. The address circuit block 150 determines whether the permanent address of detonator circuit 100 matches the address information sent from the control unit 30. If the permanent circuit address matches the transmitted address, extracted from the bit stream, the address circuit block 150 provides an enable signal to the verify status circuit block 160 and to the programmable delay portion of the delay fire circuit block 170. Of course, not all data provided by the control unit 340 is address selective. For example, the VCO correction signals would normally be addressed to all of the detonator circuits 100 simultaneously.

Each of the detonator circuits 100 can be individually programmed with a delayed firing time with this address-enable arrangement. For example, with respect to programming a detonation delay into the detonator circuit 100, since only the detonator having a permanent address that matches a particular address sent by the controller 30 can receive particular addressed data, programming each detonator circuit 100 requires a unique address command. Additionally, two enable signals may be required to assure proper programming. Thus, an address match produces a first enable signal for the delay fire circuit block 170, a program delay time command, and a second enable signal for the delay fire circuit block 170. A serial bit stream containing delay fire time information specific to the addressed detonator circuit proceeds after the program delay time command. Both the first and second enable signals must be received in order for the delay fire circuit block 170 to accept the data stream containing delay fire time information. After the last element of the data stream containing the delay fire time information is clocked into the delay fire circuit block 170, the delay fire circuit block 170 disables itself and re-enables the command section 140. This completes the loading of data into the delay fire circuit block 170.

In order for a plurality of detonator circuits 100 to begin measuring a number of programmed delay time periods, a bit stream from the control unit 30 is sent indicating that each detonator circuit 100 should initiate detonation of a match 190 after lapse of a delay time period. The command section 140 enables the delay fire circuit block 170 to receive this information. The delay fire circuit block 170 then initiates counting of the delay period. When the last count in the period is reached the delay fire circuit block 170 emits a signal to close the fire control switch 220.

In operation, when a match 192 is connected to the detonator circuit 100 and the detonator circuit 100 is coupled to a control unit 30, the control unit 30 delivers a low voltage reference signal to the fuse input terminals 120. The low voltage passes through the input interface 130 and through the arm/disarm regulator 200 to charge the capacitor 180. Initially the arm/disarm regulator 200 limits the capacitor voltage to a low level. This low voltage provides a "safe" level of charging current to assure a sufficient voltage for operation of the circuit.

Next, the control unit 30 inputs an address command to begin specific addressed data transfer. All of the commands from the control unit 30 may, for example, comprise four serial bits of command information and one bit to terminate data transfer. The command section 140 enables the address circuit block 150 to receive an address data stream. Preferably the address data string comprises ten serial bits of address data plus one bit to terminate data transfer. The ten bits of address data will allow for 1024 individual detonator addresses. Although a number of detonators may be coupled to the control unit 30, all of which will receive the address string, only the detonator with a matching permanent address will respond by generating an "address match" signal. The address match signal enables other subcircuits on the detonator with matching address, for example, the verify status circuit block 160 and the delay fire circuit block 170, to receive data.

With the delay fire circuit block 170 first enabled by the address match, a program delay time command is sent to the command section 140 to provide the second enable signal to the delay fire circuit block 170 to allow delay time data to be received. Preferably, the delay time data string sent to the addressed detonator comprises 22 bits of delay time information. With a one microsecond VCO clock period this provides delay times up to 4.194303 seconds with plus or minus one microsecond resolution. Once the addressed detonator circuit is programmed with the desired delay time, other detonator circuits 100 may be addressed and programmed in a similar manner.

The control unit 30 next sends an arm command to raise the voltage regulation provided by the arm/disarm regulator section 200 to a high level, for instance, 20 volts. This high level allows the capacitor 180 to receive sufficient charge to detonate the match when the fire control switch is closed. Of course, the driving voltage provided to the "fuse input" 120 must be elevated to raise the charge on the capacitor 180. When the capacitor 180 in each of the plurality of detonator circuits 100 reaches a percentage of maximum charge, such as 75 percent, the arm command is disabled in that circuit and the verify status circuit block 160 is set to indicate a "detonator ready" state.

Next, the control unit 30 simultaneously broadcasts a detonator ready verification command to the verify status circuit blocks 160 in all of the detonator circuits 100. Any verify status circuit blocks which are not in the "detonator ready" state will respond. If a response is received, the control unit 30 may then "trouble shoot" by sequentially issuing an address selective verification command to each verify status circuit block. In response, each addressed detonator outputs its status, "ready" or "not ready", and indicates whether timing and/or data transmission errors exist. If required, a disarm command may be given to reset the arm/disarm regulator 200, thereby adjusting the voltage regulation to a lower voltage level. In response to a disarm command, the capacitor quickly discharges to the prespecified lower voltage level, and the verify status circuit block 160 is reset to indicate a "detonator not ready" state.

On the other hand, if no response is received to the detonator ready verification command, the address selective verification command may be omitted and an oscillator correction command issued, as described above with reference to FIG. 1. The oscillator correction command is broadcast to all detonator circuits for simultaneous calibration. After all of the oscillator correction values have been converted to calibration signals, the fuse input voltage is pulsed, for example, to 15 volts, for a precise period of time, then returned to the reference value. In response to the pulse, each circuit 10 adjusts the VCO input voltage to alter the frequency of its respective VCO. The VCO correction command sequence is terminated by swinging the input voltage below the reference value, for instance, down 5 volts. As noted, it may be necessary to repeat the VCO correction command sequence to converge the frequencies of the VCOs to the desired values.

After completion of the calibration, the delay fire circuit blocks 170 of the detonator circuits 100 are ready to receive a fire command. The fire command simultaneously enables each delay fire circuit block 170 to ignite a respective match after the programmed delay time has been measured by counting the calibrated VCO clock signals.

Each circuit 100 in the system 20 individually corrects its own VCO frequency based on an externally provided time pulse. One feature of the invention is that all of the oscillator corrections can be executed at the same time, and in a short period, for example, less than a second. As described above with respect to a time sequenced blasting detonation system, the correction can be performed after broadcasting a detonator ready verification command and before sending a fire command. Generally, in the system 20, the time during which the VCO can drift from the adjusted frequency is minimal. The theoretical resolution in the frequency adjustment is one VCO clock period and the maximum drift time is essentially the maximum delay time programmed into the system circuits 100. With a maximum delay time of four seconds, timed sequencing of operations can be effected with microsecond resolution.

The VCO calibration method is easily adapted to any time base. Correction to plus or minus one microsecond is can be achieved with a one megahertz (MHz) VCO. However, to correct a one MHz VCO capable of providing four second time delay with a microsecond resolution with a single calibration time pulse, a very linear, large capacity (for instance, 22 bits) D/A converter, as well as extremely sensitive differential and summing amplifiers, may be required.

On the other hand, with an iterative procedure, such as multiple time pulses or multiple repeats of the oscillator correction command, the circuit complexity and gate count can be significantly reduced. Furthermore, if utilizing a 22 bit counter that can measure a 4 second delay time (a programmed fire delay time of four seconds requires 4,194,303 counts), the D/A converter can be driven with the least significant 8 bits of the counter to provide 128 voltage steps with one voltage step per count. The remaining bits of the counter could simply be decoded to provide signals to inform the converter 44 whether the count is on scale, in which case the converter 44 would output a voltage based on the state of the 8 bit input. If not on scale, the converter would output a maximum negative or positive voltage depending on whether the count is above or below scale.

Variations in D/A converter output levels among different clock circuits 10 in the system 20 may be compensated for in the VCO adjustment process. Indeed, absolute voltages have little or no consequence on the correction scheme. Nonlinearity in the converter steps and sensitivities of the VCOs are factors which may also dictate multiple iterations of the calibration steps to attain frequency convergence.

It is desirable, particularly for blasting detonator circuitry, to form the complete circuit 100 as a monolithic integrated circuit (IC). Practical implementation of the FIG. 3 detonator circuitry on an IC can be achieved with less than 900 gates. One way of minimizing the gate count is to provide subcircuits, such as the oscillator correction circuit block 110 and the delay fire circuit block 170 sharing the same counter circuitry. Through shared use of the counter, additional circuit functions such as error detection can be efficiently added to the IC.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for activating a blasting detonator circuit of the type having a voltage controlled oscillator (VCO) to control a time delay before detonation, comprising:
   (a) calibrating the frequency of the VCO by:
      (i) counting clock pulses from the VCO during a period defined externally from the blasting detonator circuit;
      (ii) comparing the clock pulse count with a predetermined value stored within the blasting detonator circuit indicating a desired clock pulse count;
      (iii) determining a difference between the clock pulse count and the predetermined value to provide a difference signal; and
      (iv) modifying an oscillator control voltage in accordance with the difference signal;
   (b) measuring the time delay with the VCO; and
   (c) providing a signal to ignite a combustible element after measuring the time delay.

2. An externally tunable clock circuit, comprising:
   an oscillator providing clock pulses of variable frequency based on an oscillator input voltage;
   a counter connected to receive the clock pulses to provide a clock pulse count indicating clock pulses generated by the oscillator during a predetermined period provided externally from the tunable clock circuit;
   a circuit to generate a difference signal indicating a difference between the clock pulse count and a predetermined value stored within the tunable clock circuit; and
   circuitry coupled to adjust the oscillator input voltage based on the difference signal;
   an input for receiving signals from a control unit:
   a storage capacitor connected to receive a charging current from the input;
   an output terminal for receiving current from the capacitor, said output terminal being connectable to a detonator element;
   a switch for selectively discharging the capacitor through said output terminal; and
   a firing circuit for connection to receive an external signal, said firing circuit being connected to the counter and being operable to close the switch to discharge the capacitor a predetermined time after an occurrence of external signal, the aforesaid combination forming a blasting detonator circuit.

3. The circuit of claim 2 wherein said firing circuit includes programmable components for receiving and holding externally specified delay periods.

4. The circuit of claim 2 further comprising a regulator for controlling the maximum charge on the capacitor and for varying the voltage across the capacitor.

5. A system of tunable clock circuits, comprising:
   (a) a plurality of integrated circuits each including:
      (i) a voltage controlled oscillator (VCO) for providing clock signals of variable frequency based on a VCO input voltage;
      (ii) a counter connected to receive timing and control signals as well as signals from the VCO and provide a digital clock count indicative of clock signals generated by the VCO during a predetermined period; and
      (III) a circuit connected to adjust the input voltage to the VCO based on differences between the digital clock count and a predetermined value; and
   (b) a controller coupled to provide timing and control signals to each integrated circuit to define predetermined periods;
   a storage capacitor connected to receive a charging current from the controller;
   an output terminal for receiving current from the capacitor, said output terminal being connectable to an ignition element;
   a switch for selectively discharging the capacitor through said terminal; and
   a firing circuit connected to receive a fire signal from the controller and connected to the counter, said firing circuit operable to close the switch and discharge the capacitor a predetermined time after receiving the fire signal, the aforesaid combination forming a blasting detonator circuit, said system providing for individual control of timed detonations at a plurality of locations, activation of each detonation being delayable by a predetermined time periods that may be different.

6. The circuit of claim 5 wherein said firing circuit comprises programmable components for receiving and holding specified delay periods.

7. A system for individually controlling various timed operations among a plurality of locations, activation of an operation at each location being delayable by a programmable time, comprising:
   (a) a plurality of addressable circuits each having a programmable delay time, each circuit comprising:
      (i) a voltage controlled oscillator (VCO) for providing clock signals of variable frequency based on an input voltage;
      (ii) a counter connected to receive timing and control signals and clock signals from the VCO to provide a digital VCO clock count indicating clock signals generated by the VCO during an externally provided predetermined period;
      (iii) a circuit connected to adjust the input voltage to the VCO based on differences between the VCO clock count and a predetermined value; and
      (iv) an activation circuit connected to initiate an operation after an externally defined delay time measured by VCO clock signals; and
   (b) a controller coupled to individually address each addressable circuit and provide each addressable circuit with timing signals defining the predetermined period and a delay time, said controller further providing a control signal to start each addressable circuit to measure the delay times to initiate operations of the activation circuits.

8. The system of claim 7 further comprising a plurality of combustible elements and storage capacitors, each associated with a respective one of said addressable circuits said storage capacitors being discharged by a respective activation circuit to effect time sequenced ignition of the combustible elements.

9. The system of claim 8 further comprising a plurality of explosive charges each coupled to a respective one of said combustible elements.

* * * * *